(12) United States Patent
Yamada et al.

(10) Patent No.: US 6,322,084 B1
(45) Date of Patent: Nov. 27, 2001

(54) METAL GASKET WITH BORE RING

(75) Inventors: Yoshio Yamada; Yutaka Kato, both of Utsunomiya (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 09/496,665

(22) Filed: Feb. 3, 2000

(30) Foreign Application Priority Data

Feb. 12, 1999 (JP) .................................................. 11-034094

(51) Int. Cl.[7] ...................................................... F02F 11/00
(52) U.S. Cl. ............................................ 277/591; 277/593
(58) Field of Search ............................... 277/591, 598, 277/593, 601, 600

(56) References Cited

U.S. PATENT DOCUMENTS

| | | | |
|---|---|---|---|
| 1,627,167 | * | 6/1925 | Fitzgerald ............................ 277/598 |
| 1,738,513 | * | 5/1925 | Bailey ................................. 277/598 |
| 1,798,246 | * | 9/1930 | Braner ................................ 277/598 |
| 4,776,601 | * | 10/1988 | Yamada ............................... 277/232 |
| 5,004,249 | * | 4/1991 | Grosch ................................ 277/207 |
| 5,310,197 | * | 5/1994 | Bruch ................................. 277/235 |
| 5,522,604 | | 6/1996 | Weiss et al. . |
| 5,899,462 | * | 5/1999 | Udagawa ............................. 277/593 |
| 6,036,195 | * | 3/2000 | Udagawa ............................. 277/595 |
| 6,062,572 | * | 5/2000 | Hasegawa ............................ 277/592 |
| 6,105,971 | * | 8/2000 | Hasegawa ............................ 277/593 |

FOREIGN PATENT DOCUMENTS

| 922 452 | 1/1955 | (DE) . |
|---|---|---|
| 0 819 872 | 1/1998 | (EP) . |

* cited by examiner

Primary Examiner—Anthony Knight
Assistant Examiner—Matthew E. Rodgers
(74) Attorney, Agent, or Firm—Kanesaka & Takeuchi

(57) ABSTRACT

A metal gasket for an internal combustion engine is formed of a main gasket portion extending substantially throughout an entire area to be sealed. The main gasket portion is formed of at least one metal plate and has at least one hole to be sealed. A bore ring is disposed inside the at least one hole of the main gasket portion. The bore ring has a top portion and a bottom portion longer than the top portion to provide rigidity of the bore ring. The gasket can be properly fitted with the engine parts while protecting a bead formed on the metal plate to securely seal around the hole.

11 Claims, 2 Drawing Sheets

METAL GASKET WITH BORE RING

BACKGROUND OF THE INVENTION AND RELATED ART STATEMENT

The present invention relates to a metal gasket with a bore ring, in particular a metal cylinder head gasket with a bore ring to be installed between a cylinder head and a cylinder block of an internal combustion engine.

A cylinder head gasket installed between a cylinder head and a cylinder block of an engine is provided with a plurality of cylinder bores, water holes, oil holes, bolt holes and so on. In the engine, since high temperature and high pressure combustion gases are formed in the cylinder bores when the engine is actuated, sealings around the cylinder bores are important. Thus, the bolts for connecting the cylinder head and cylinder block with the gasket therebetween are arranged generally around the cylinder bores.

Also, sealing means, such as beads, are formed around the cylinder bores of the gasket. When the cylinder head and the cylinder block with the gasket therebetween are tightened, the sealing means are compressed to thereby form counter forces thereat, which generate sealing pressures to seal around the cylinder bores.

On the other hand, since the engine has been developed to provide high power and light in weight with small size, combustion gases with high pressures are formed. Thus, it is the tendency that the tightening pressure and the bead counter force are getting stronger.

Also, in the gasket, since the sealing means, such as bead, is exposed to high temperature and high pressure formed in the cylinder bore, there has been a problem that creep relaxation occurs in the bead, resulting in fatigue destruction of the bead.

As stated above, the engine is required to have light weight. Thus, the cylinder head and the cylinder block are formed of relatively light metal, such as aluminum or aluminum alloy. In this respect, since the gasket is formed of relatively hard metal, the gasket does not fit properly with the cylinder head and cylinder block formed of the light metal. Thus, the difference of heat expansion between the gasket and the engine parts, e.g. cylinder head and cylinder block, becomes greater. As a result, the rubbing occurs between the bead and the gasket attaching portions of the cylinder head and the cylinder block. Namely, the cylinder head and the cylinder block formed of relatively light metal are damaged by the expansion and contraction of the bead to thereby reduce the sealing ability around the cylinder bore.

In view of the above problems, U.S. Pat. No. 5,895,054 has been proposed, wherein a thick ring spacer or annular ring is situated in a cylinder bore of a metal plate for the gasket such that the annular ring does not come off or separate from the metal plate easily by press fitting at several portions.

In this gasket, the annular ring is formed accurately, and is assembled with the gasket. Thus, the surface pressure around the cylinder bore can be formed equally to securely seal around the cylinder bore. However, since the annular ring is very thin, it is very difficult to attach the annular ring to the metal plate with a press fitting. Also, since the annular ring is located inside the metal plate and the metal plate does not have a portion laminating with a different metal portion, the metal plate for the gasket does not have a cushioning mechanism with respect to the engine parts, i.e. cylinder head and cylinder block, so that the gasket does not fit so properly or closely with the engine parts. Especially, if a bead portion of the metal plate contacts the engine parts directly, the engine parts are likely to be damaged by the bead to cause gas leakage thereat.

The present invention has been made in view of the above conventional gaskets, and an object of the invention is to provide a metal gasket with a bore ring, which fits smoothly and closely with engine parts to securely seal around a hole to be sealed.

Another object of the invention is to provide a metal gasket with a bore ring as stated above, wherein a bead of the gasket is protected to prevent creep relaxation.

A further object of the invention is to provide a metal gasket with a bore ring as stated above, wherein a surface pressure for sealing can be accurately adjusted.

A still further object of the invention is to provide a metal gasket with a bore ring as stated above, wherein the gasket can be manufactured easily.

Further objects and advantages of the invention will be apparent from the following description of the invention.

SUMMARY OF THE INVENTION

A metal gasket for an internal combustion engine of the invention is basically formed of a main gasket portion extending substantially throughout an entire area to be sealed and formed of at least one metal plate. The main gasket portion has at least one hole to be sealed. In the invention, a bore ring is disposed inside the hole of the main gasket portion. The bore ring has a top portion and a bottom portion longer than the top portion to provide rigidity of the bore ring.

Preferably, the bore ring includes an annular portion disposed inside the hole, and a flange extending from the annular portion and disposed under the main gasket portion around the hole. In this structure, since the bore ring has an L-shape in cross section, the bore ring has a relatively high rigidity to resist deformation by the force applied thereto. When the annular portion is disposed inside the hole, the flange abuts against the main gasket portion, so that the bore ring can be easily positioned in the main gasket portion. Also, since the bore ring is not easily disengaged from the main gasket portion, the handling of the gasket in processing can be facilitated.

The main gasket portion may include a sealing device around the hole. In this case, the flange is disposed under the sealing device. The sealing device may be a bead in the form of a semicircular, mountain-like or trapezoidal shape. The sealing device may be an emboss or grommet already known in the art.

In the invention, the sealing pressure can be accurately adjusted by adjusting the thickness of the flange laminated with the sealing device. Thus, the sealing ability around the hole can be improved.

In case the sealing device of the main gasket portion is a bead, the flange may include a bead around the annular portion. In this case, the beads of the main gasket portion and the flange are laminated together. Since the resilient forces by the beads are increased by the two beads, high surface pressure is obtained by the beads around the hole to be sealed.

The main gasket portion may further include a second metal plate disposed under the metal plate and above the flange. The second metal plate may have a solid sealing portion between the sealing device and the annular portion of the bore ring to securely seal around the hole.

In the invention, the bore ring may have a trapezoidal shape in section, which has top and bottom portions parallel to each It other, an inner vertical portion and an outer inclined portion. The top portion has an outer diameter less than an inner diameter of the hole to be sealed, and the bottom portion has an outer diameter greater than the inner diameter of the hole. In this structure, the bore ring still has a sufficient rigidity, and when the bore ring is inserted into the hole of the main gasket portion, the inclined portion of the bore ring surely engages the main gasket portion. Thus, the bore ring can be easily and accurately assembled with the main gasket portion without precise arrangement.

Preferably, the bore ring is made of metal softer than the metal plate of the main gasket portion, such as aluminum or alloy thereof. The bore ring made of the soft metal fits the cylinder block and the cylinder head closely and properly, and does not hurt the cylinder block and the cylinder head. Thus, the sealing ability is improved. Also, when the bore ring and the main gasket portion are assembled by a press mechanism, they are properly fixed together to thereby improve the assembly.

In case the bore ring is made of aluminum or an alloy thereof, since the engine parts are generally formed of aluminum or alloy thereof, the difference of heat expansion between the gasket and the engine parts can be reduced. Thus, the bore ring can be properly fixed to the engine parts to securely seal around the hole.

DETAILED DESCRIPTION OF PREFERRED EMBODIMENTS

The present invention will be explained in detail with reference to the accompanying drawings. The invention is applied to a cylinder head gasket for an internal combustion engine, but the invention may be used for other gasket.

Figure 1:
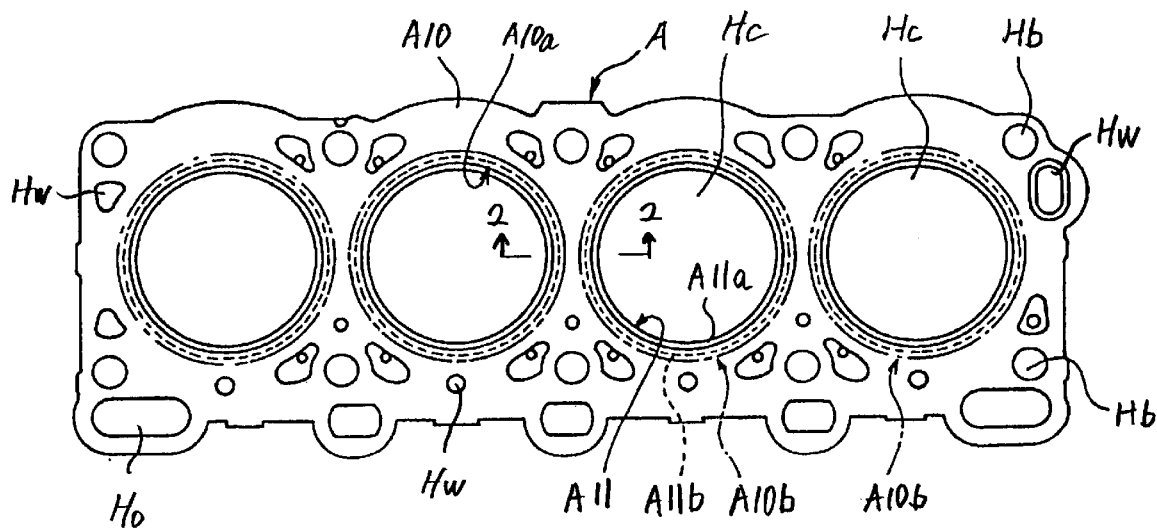
FIG. 1 is a plan view of a first embodiment of a cylinder head gasket of the invention.
Figure 2:
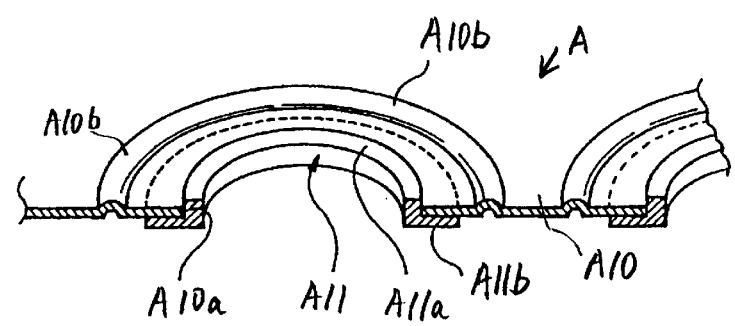
FIG. 2 is an enlarged perspective sectional view taken along line 2—2 in FIG. 1.

As shown in FIGS. 1 and 2, a first embodiment A of a metal gasket of the invention is formed of a metal plate A10 extending substantially throughout an entire area of an engine to be sealed, and bore rings A11. The metal plate A10 includes a plurality of, i.e. four, cylinder bores Hc, water holes Hw, oil holes Ho, bolt holes Hb and so on, as in the conventional gasket.

The cylinder bore Hc in the gasket is smaller than a hole A10a formed in the metal plate A10 because the bore rings A11 is inserted in the hole A10a. The metal plate A10 includes, in addition to the holes A10a, beads A10b as sealing means formed around the holes A10a. The bead A10b may have a semicircular shape or trapezoidal shape. Although the metal plate A10 further includes sealing means for the water holes Hw and oil holes Ho, the sealing means for these holes are omitted in FIG. 1.

The bore ring A11 is formed of an annular portion A11a, and a flange A11b extending radially outwardly from the annular portion A11a. The thickness or height of the annular portion A11a is determined based on the height of the bead A10b. Generally speaking, the thickness of the annular portion A11a from the upper surface of the flange A11b is less than the height of the bead A10b including the thickness of the metal plate A10 and greater than the thickness of the metal plate A10. The flange A11b has the thickness less than that of the annular portion A11a.

The bore ring A11 is formed of metal softer than the metal plate A10. In case the gasket A is formed of a plurality of metal plates laminated together, the bore ring A11 is softer than all of the metal plates. Preferably, the bore ring A11 is made of aluminum or alloy thereof.

When the bore ring A11 is assembled with the metal plate A10, the annular portion A11a is located in the hole A10a, while the flange A11b is placed under the metal plate A10 around the hole A10a and radially inside the bead A10b. The flange A11b does not overlap the bead A10b. The engagement of the bore ring A11 with the metal plate A10 is made by a press mechanism, so that the bore ring A11 is surely engaged with the metal plate A10.

In the gasket A, the thickness of the annular portion A11a above the upper surface of the flange is selected to protect the bead A10b, i.e. less than the height of the bead A10b but greater than the thickness of the metal plate A10. Namely, when the gasket A is tightened, the bead A10b is not completely flattened by the annular portion A11a to prevent creep relaxation of the bead A10b. Also, the thickness of the flange A11b is selected to precisely regulate the sealing pressure of the bead A10b to securely seal by the bead A10b.

In the gasket A, since the bore ring A11 has an L-shape in cross section, the rigidity of the bore ring A11 is increased. Thus, when the gasket is used, the bore ring A11 is not easily deformed to keep the shape as it is. When the annular portion A11a is inserted into the hole A10a in assembling the bore ring A11 with the metal plate A10, the flange A11b abuts against the metal plate A10, so that the location of the bore ring A11 can be easily set. Also, when the bore ring A11 is assembled with the metal plate A10 by a press, the bore ring A11 can be fixed to the metal plate A10 without easy disassembly, so that the handling in assembly is facilitated.

In the gasket A, since the bore ring A11 is formed of aluminum or alloy thereof, the bore ring A11 is closely and properly fitted to the engine parts, such as cylinder head and cylinder block, and does not hurt the engine parts, so that the sealing ability is increased. Also, when the gasket is assembled by a press, the bore ring A11 can be fixed to the metal plate A10 with relatively large adhesion ability.

In case the engine parts are formed of aluminum or alloy thereof similar to the material of the bore ring A11, the difference of heat expansion between the bore ring A11 and the engine parts is greatly reduced. Thus, the bore ring is not forcibly moved relative to the engine parts due to heat expansion and contraction when the engine is actuated and stopped, so that the gasket can securely seal between the engine parts.

Figure 3:
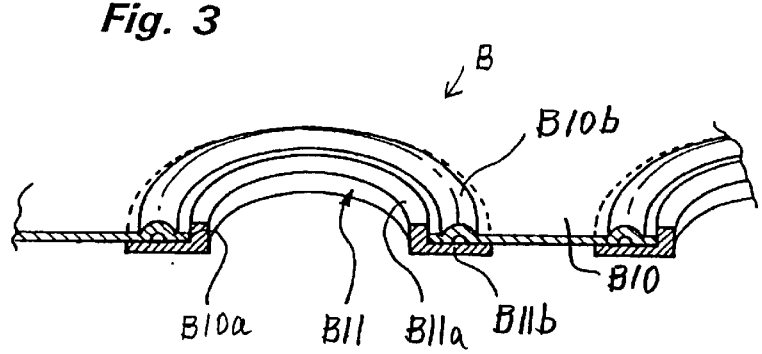
FIGS. 3–8 are perspective sectional views, similar to FIG. 2, for showing econd to seventh embodiments of the cylinder head gasket of the invention.

FIG. 3 is a perspective sectional view, similar to FIG. 2, for showing a second embodiment B of a cylinder head gasket of the invention. The gasket B is formed of a metal plate B10 having a hole B10a and a bead B10b, and a bore ring B11 having an annular portion B11a and a flange B11b, similar to the gasket A. In the gasket A, the flange A11b extends outwardly up to a point just before the bead A11b, but in the gasket B, the flange B11b extends just outside the bead B10b. Since the flange B11b overlaps the bead B10b, the surface pressure formed by the bead B10b can be precisely adjusted by selecting the thickness of the flange B11b. The sealing ability can be further improved.

Figure 4:
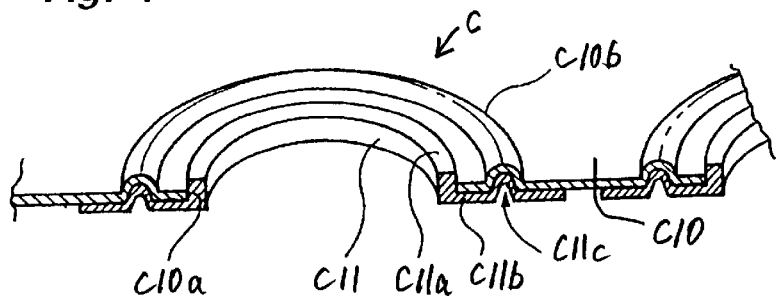

FIG. 4 is a perspective sectional view, similar to FIG. 2, for showing a third embodiment C of a cylinder head gasket of the invention. The gasket C is formed of a metal plate C10 having a hole C10a and a bead C10b, and a bore ring C11 having an annular portion C11a and a flange C11b, similar to the gasket B. In the gasket C, however, the flange C11b has a bead C11c overlapping the bead C10b. In the gasket C, since the beads C10b, C11c form sealing means outside the annular portion C11a, the surface pressure of the sealing means can be increased significantly to securely seal around the hole.

Figure 5:
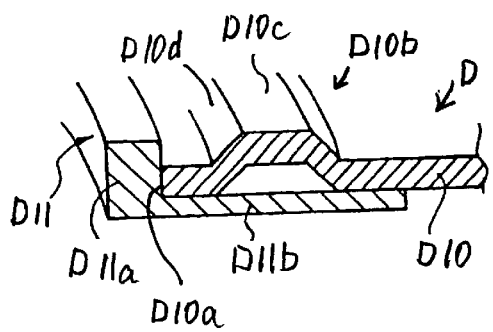

FIG. 5 is a perspective sectional view, similar to FIG. 2, for showing a fourth embodiment D of a cylinder head gasket of the invention. The gasket D is formed of a metal plate D10 having a hole D10a and a bead D10b, and a bore ring D11 having an annular portion D11a and a flange D11b. In the gasket D, as shown in FIG. 5, the bead D10b has a trapezoidal shape having a top flat portion D10c and two inclined portions D10d. The rest of the structure of the gasket D is the same as that of the gasket B shown in FIG. 3.

Figure 6:
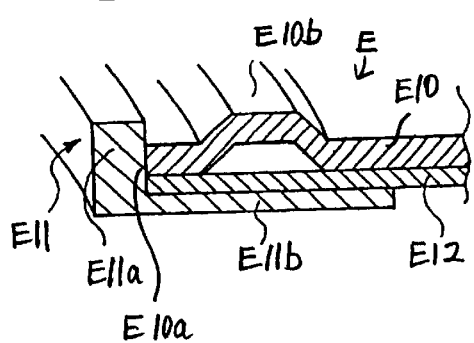

FIG. 6 is a perspective sectional view, similar to FIG. 2, for showing a fifth embodiment E of a cylinder head gasket of the invention. The gasket E is formed of a metal plate E10 having a hole E10a and a bead E10b, and a bore ring E11 having an annular portion E11a and a flange E11b, similar to the gasket D. In the gasket E, however, an auxiliary plate E12 is situated under the metal plate E10 to extend substantially throughout the entire area to be sealed. The gasket E is used for an engine requiring a thick gasket.

Figure 7:
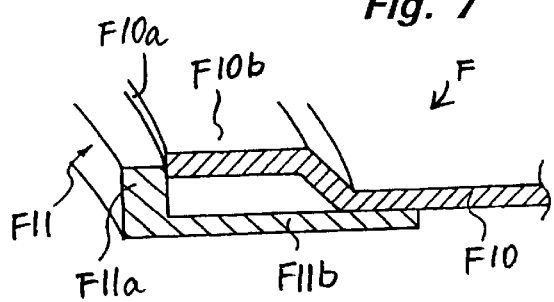

FIG. 7 is a perspective sectional view, similar to FIG. 2, for showing a sixth embodiment F of a cylinder head gasket of the invention. The gasket F is formed of a metal plate F10 having a hole F10a and a bead F10b, and a bore ring F11 having an annular portion F11a and a flange F11b. In the gasket F, the bead F10b is a stepped bead, which does not provide so strong surface pressure. This structure is used for sealing around the cylinder bore, but may be used for other hole, such as water hole.

Figure 8:
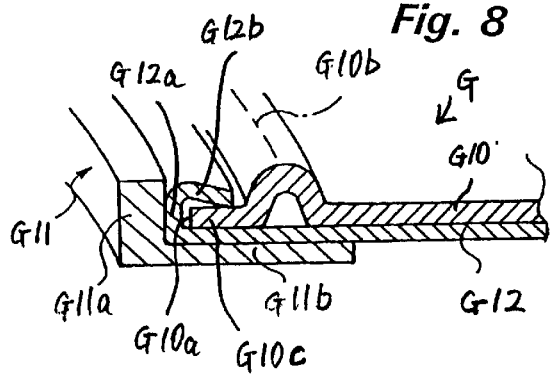

FIG. 8 is a perspective sectional view, similar to FIG. 2, for showing a seventh embodiment G of a cylinder head gasket of the invention. The gasket G is formed of a metal plate G10 having a hole G10a, a bead G10b, and a bore ring G11 having an annular portion G11a and a flange G11b, similar to the gasket B. However, the gasket G further includes an auxiliary plate G12 situated under the plate G10 and extending substantially throughout the entire area to be sealed. The auxiliary plate G12 includes an upright portion G12a and a flange G12b situated above an edge G10c of the metal plate G10. The flange G12b forms a solid portion together with the edge G10c. In the gasket G, since the solid portion is formed, when the gasket G is tightened strongly, the annular portion G11a and the bead G10b are protected by the solid portion. Thus, the gasket G is useful for an engine requiring high tightening pressure.

Figure 9:
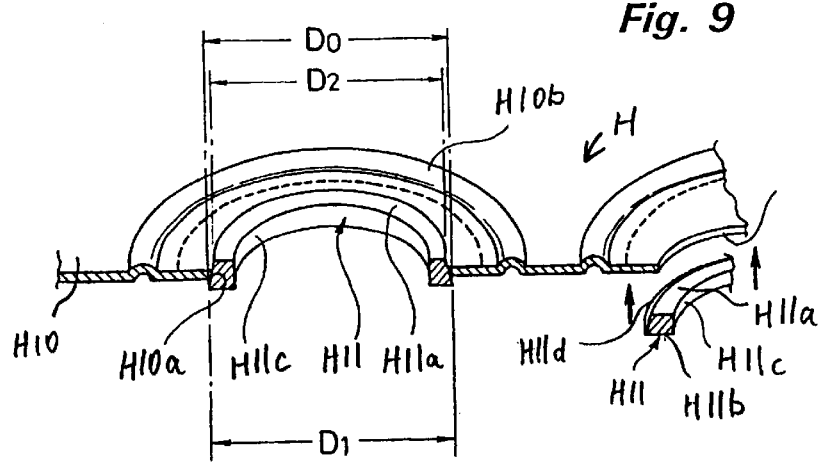
FIG. 9 is an explanatory perspective sectional view of an eighth embodiment of the cylinder head gasket of the invention.

FIG. 9 is a perspective sectional view for showing an eighth embodiment H of a cylinder head gasket of the invention. The gasket H is formed of a metal plate H10 having a hole H10a and a bead H10b, and a bore ring H11 having a trapezoidal shape in section. Namely, the bore ring H11 has top and bottom surfaces H11a, H11b parallel to each other, an inner surface H11c perpendicular to the top and bottom surfaces H11a, H11b, and an outer surface H11d inclined to the top and bottom surfaces H11a, H11b. The outer diameter $D_1$ of the bottom surface H11b is greater than the inner diameter $D_0$ of the hole H10a, and the outer diameter $D_2$ of the top surface H11a is less than the inner diameter $D_0$. The thickness or height of the bore ring H11 is determined by the sealing device, i.e. bead H10b, but the thickness is generally lower than the height of the bead H10b.

As stated above, the bore ring H11 has the trapezoidal shape in section. This shape has a rigidity less than the L-shape as in the gasket A, but it has a sufficient rigidity by properly selecting the respective sizes of the bore ring H11.

In assembling the bore ring H11 with the metal plate H10, when the bore ring H11 is forcibly entered into the hole H10a, since the bore ring H11 is formed of relatively soft metal, the outer surface H11d is slightly deformed to bite or engage the metal plate H10. The bore ring Hil can be easily press-fixed to the metal plate H10 due to metal affinity or adhesiveness. Also, since the outer surface H11d inserting into the hole H10a has a conical shape, the bore ring H11 can be easily located and properly fixed to the metal 103 plate H10.

In the present invention, in case the bore ring has the L-shape in section, the bore ring has sufficiently rigidity. In this connection, when the bore ring is inserted into the hole of the metal plate, the flange of the bore ring abuts against the metal plate and does not disengage easily from the metal plate, so that the bore ring can be easily positioned and assembled with the metal plate. The working ability is improved.

In case the bore ring is formed of the soft metal, such as aluminum or alloy thereof, softer than the metal plate, the bore ring can fit properly with the cylinder bore and cylinder block, so that the bore ring does not hurt the cylinder bore and cylinder block to thereby improve the sealing ability. Also, when the bore ring is assembled by a press, the bore ring can be securely adhered to the metal plate.

In case the bore ring has a trapezoidal shape in section, when the bore ring is inserted into the hole of the metal plate, the bore ring can be easily and firmly fixed to the metal plate.

In case the bore ring is formed of the material identical to or similar to that of the cylinder head and cylinder block, the difference of heat expansion between the gasket and the engine parts can be reduced. Thus, the damage due to difference of heat expansion is reduced.

In case the bead is formed on the metal plate laminating the flange of the bore ring, the thickness of the flange is adjusted to regulate the surface pressures at the annular portion and the bead. Also, since the thickness of the annular portion of the bore ring is greater than that of the metal plate, creep relaxation of the bead on the metal plate can be protected. Further, if the beads are formed on the metal plate and the flange to laminate each other, spring constant of the beads can be increased to securely seal around the hole.

While the invention has been explained with reference to the specific embodiments of the invention, the explanation is illustrative, and the invention is limited only by the appended claims.

What is claimed is:

1. A metal gasket for an internal combustion engine, comprising:

a main gasket portion extending substantially throughout an entire area to be sealed, said main gasket portion being formed of at least one metal plate and having at least one hole to be sealed, and a bore ring including an annular portion disposed inside the at least one hole of the main gasket portion without overlapping the main gasket portion and having a top portion, and a flange extending from the annular portion and disposed under the main gasket portion around the at least one hole, said flange having a bottom portion longer than the top portion to provide rigidity of the bore ring.

2. A metal gasket according to claim 1, wherein said main gasket portion includes a sealing device around the at least one hole, said flange being disposed under the sealing device.

3. A metal gasket according to claim 2, wherein said sealing device of the main gasket portion is a bead, and said flange includes a bead around the annular portion, said beads of the main gasket portion and the flange overlapping each other.

4. A metal gasket according to claim 2, wherein said main gasket portion further includes a second metal plate disposed under the at least one metal plate and above the flange, said second metal plate having a solid sealing portion between the sealing device and the annular portion.

5. A metal gasket according to claim 4, wherein said bore ring is made of metal softer than the at least one metal plate.

6. A metal gasket according to claim 1, wherein said annular portion has a height greater than a thickness of the main gasket portion to project outwardly from the main gasket portion.

7. A metal gasket according to claim 6, wherein said main gasket portion includes a sealing device, said annular portion projecting outwardly from the main gasket portion operating to prevent creep relaxation of the sealing means.

8. A metal gasket for an internal combustion engine, comprising:

a main gasket portion extending substantially throughout an entire area to be sealed, said main gasket portion being formed of at least one metal plate and having at least one hole to be sealed, and a bore ring disposed inside the at least one hole of the main gasket portion and having a top portion and a bottom portion longer than the top portion to provide rigidity of the bore ring, said bore ring having a trapezoidal shape in section having said top and bottom portions parallel to each other, an inner vertical portion, and an outer inclined portion.

9. A metal gasket according to claim 8, wherein said top portion has an outer diameter less than an inner diameter of the at least one hole, and said bottom portion has an outer diameter greater than the inner diameter of the at least one hole.

10. A metal gasket according to claim 9, wherein said bore ring is made of metal softer than the at least one metal plate.

11. A metal gasket according to claim 10, wherein said bore ring is made of an aluminum alloy.

* * * * *

UNITED STATES PATENT AND TRADEMARK OFFICE
CERTIFICATE OF CORRECTION

PATENT NO. : 6,322,084 B1
DATED : November 27, 2001
INVENTOR(S) : Yoshio Yamada, Yutaka Kato It is certified that error appears in the above-identified patent and that said Letters Patent is hereby corrected as shown below:

<u>Column 3,</u>
Line 1, delete "It";
Line 55, change "rings" to -- ring --; and <u>Column 6,</u>
Line 16, delete "103".

Signed and Sealed this

Thirtieth Day of April, 2002

Attest:

Attesting Officer

JAMES E. ROGAN
*Director of the United States Patent and Trademark Office*